(12) United States Patent
Hamasaki (10) Patent No.: US 12,006,634 B2
(45) Date of Patent: Jun. 11, 2024

(54) PAPER FOR TOTAL HEAT EXCHANGE ELEMENT AND TOTAL HEAT EXCHANGE ELEMENT

(71) Applicant: MITSUBISHI PAPER MILLS LIMITED, Tokyo (JP)

(72) Inventor: Yoshiyuki Hamasaki, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 906 days.

(21) Appl. No.: 17/041,168

(22) PCT Filed: Mar. 27, 2019

(86) PCT No.: PCT/JP2019/013471
§ 371 (c)(1),
(2) Date: Sep. 24, 2020

(87) PCT Pub. No.: WO2019/189516
PCT Pub. Date: Oct. 3, 2019

(65) Prior Publication Data
US 2021/0010765 A1   Jan. 14, 2021

(30) Foreign Application Priority Data

Mar. 28, 2018  (JP) .................................. 2018-062977
Jan. 25, 2019  (JP) .................................. 2019-011164

(51) Int. Cl.
*D21H 27/00*  (2006.01)
*C09K 5/14*   (2006.01)
(Continued)

(52) U.S. Cl.
CPC .............. *D21H 27/00* (2013.01); *C09K 5/14* (2013.01); *D21H 11/04* (2013.01); *D21H 17/66* (2013.01);
(Continued)

(58) Field of Classification Search
CPC ........ D21H 11/04; D21H 21/22; D21H 17/66; D21H 27/00; C09K 5/14; F28D 21/0015
See application file for complete search history.

(56) References Cited

U.S. PATENT DOCUMENTS

| 6,132,557 A | 10/2000 | Takeuchi et al. |
| 2003/0226656 A1 | 12/2003 | Harada et al. |

(Continued)

FOREIGN PATENT DOCUMENTS

| CN | 1210926 | 3/1999 |
| CN | 1607371 | 4/2005 |

(Continued)

OTHER PUBLICATIONS

Office Action dated Jul. 5, 2021 in Chinese Patent Application No. 201980022243.6, with English Translation.

(Continued)

*Primary Examiner* — Catherine A. Simone
(74) *Attorney, Agent, or Firm* — Wenderoth, Lind & Ponack, L.L.P.

(57) ABSTRACT

An object of the present invention is to provide a paper for total heat exchange element, which has both of the heat transfer property and the moisture permeation property and is also excellent in the gas barrier property, and the present invention relates to a paper for total heat exchange element including a base paper containing a beaten natural pulp and a hygroscopic agent applied to the base paper, wherein a ratio of a fine fraction having a fiber length of 0.05 mm or less in the beaten natural pulp is from 10 to 25%.

11 Claims, 2 Drawing Sheets

(51) Int. Cl.
*D21H 11/04* (2006.01)
*D21H 17/66* (2006.01)
*D21H 21/22* (2006.01)
*F28D 21/00* (2006.01)

(52) U.S. Cl.
CPC ......... *D21H 21/22* (2013.01); *F28D 21/0015* (2013.01)

(56) References Cited

U.S. PATENT DOCUMENTS

| | | |
|---|---|---|
| 2005/0082045 A1 | 4/2005 | Takada et al. |
| 2009/0068437 A1 | 3/2009 | Miyagoshi et al. |
| 2013/0233529 A1 | 9/2013 | Harada et al. |
| 2015/0167249 A1 | 6/2015 | Ono et al. |
| 2016/0194832 A1 | 7/2016 | Ono et al. |
| 2016/0237620 A1 | 8/2016 | Takeda et al. |
| 2017/0030657 A1 | 2/2017 | Omori et al. |

FOREIGN PATENT DOCUMENTS

| | | |
|---|---|---|
| CN | 105874295 | 8/2016 |
| EP | 3 023 542 | 5/2016 |
| EP | 3 054 228 | 8/2016 |
| JP | 11-189999 | 7/1999 |
| JP | 2007-119969 | 5/2007 |
| JP | 2008-14623 | 1/2008 |
| JP | 2009-250585 | 10/2009 |
| JP | 2016-108704 | 6/2016 |
| TW | 500858 | 9/2002 |
| WO | 02/099193 | 12/2002 |
| WO | 2014/014099 | 1/2014 |
| WO | 2015/050104 | 4/2015 |

OTHER PUBLICATIONS

Extended European Search Report dated Nov. 18, 2021 in corresponding European Patent Application No. 19778052.1.
International Search Report, dated Jun. 4, 2019 in corresponding International Patent Application No. PCT/JP2019/013471, with English language translation.

PAPER FOR TOTAL HEAT EXCHANGE ELEMENT AND TOTAL HEAT EXCHANGE ELEMENT

TECHNICAL FIELD

The present invention relates to a paper for total heat exchange element and a total heat exchange element.

BACKGROUND ART

In recent years, along with the progress of high airtightness, high heat insulation and the like of housing in order to save energy, a health effect which is called as sick house syndrome resulting from indoor air pollution is pointed out. This is a result of progress in indoor air pollution owing to chemical substances released from building materials and pollutants such as carbon monoxide, carbon dioxide and nitrogen oxides released from combustion equipment. Further, in the case of high humidity, bacteria, mold and tick propagate, and in the case of low humidity, increase in floating dust and propagation of viruses of influenza and the like are apt to occur to cause health effects, for example, allergies.

In Japan, according to the amended Building Standard Act enforced on 2003, installation of mechanical ventilation equipment is obliged in principle in housing, but as a result, heat energy is released outdoors and thus the energy saving effect initially aimed decreases. In response to this, there increases a demand for a total heat exchange ventilation device that recovers the heat energy released outdoors while achieving ventilation. At the recent time when global warming has been expressed, a total heat exchange element having a higher total heat exchange efficiency has been required. The total heat exchange element is an element installed in a total heat exchanger (total heat exchange ventilation device) which supplies fresh outside air and also exhausts foul air in the room in order to maintain a comfortable space in buildings, offices, stores, residences, and the like. Ventilation is performed through the total heat exchange element in such a manner that outside air is not mixed with indoor exhaust. At the ventilation, sensible heat (temperature) and latent heat (humidity), which are energy in the room, are recovered through a paper for total heat exchange element used in the total heat exchange element. Therefore, the heat exchange element is required to have such performances that a heat transfer property, a moisture permeation property and a gas barrier property are excellent and mixing of supplied air and exhaust air does not occur.

Figure 1:
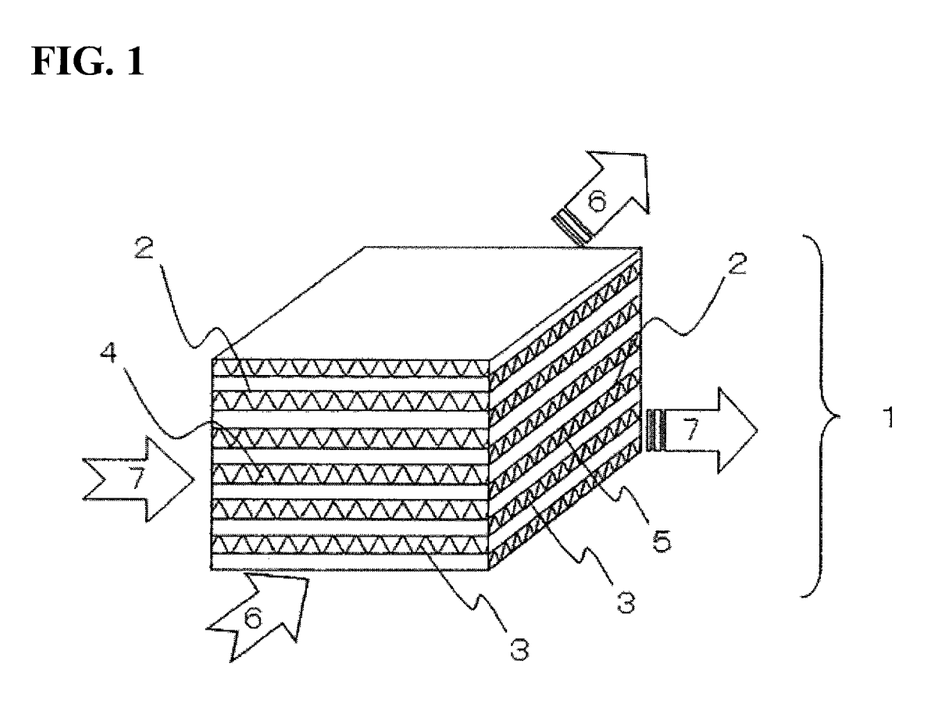
FIG. 1 is a schematic perspective view of a total heat exchange element having a cross flow type laminated structure.

As shown in FIG. 1, a total heat exchange element 1 having a cross flow type laminated structure ordinarily utilized in the field of air conditioning is formed by laminating and adhering basic constituting members each formed by laminating a partition member 2 having a plain shape and a spacing member 3 having a cross-sectional wave shape so that the wave directions of the spacing members 3 intersect each other at a right angle or an angle close to a right angle. By letting an air flow 6 and an air flow 7, which have states different from each other, flow into a flow channel 4 and a flow channel 5 formed by the spacing members 3 and adjacent in the lamination direction, exchange of the sensible heat and latent heat between two air flows is achieved through the partition member 2 as a medium. The term "air flows which have states different from each other" ordinarily means flows of air which are different in temperature and humidity conditions, and for example, fresh outside air is let flow into the channel 4 and foul air in the room is let flow into the channel 5.

The partition member 2 is positioned between two air flows 6 and 7 flowing in the flow channels 4 and 5, respectively, and since it is present as a medium for exchanging the sensible heat and the latent heat, the heat transfer property and moisture permeation property of the partition member 2 greatly influence on the sensible heat and latent heat exchange efficiency of the total heat exchange element. Further, in a total heat exchange element for air conditioning, it is particularly required to reduce migration of volatile substances such as formaldehyde or toluene between the air flows 6 and 7, the partition member 2 is also required to have high gas barrier property in addition to the performances described above.

The spacing member 3 plays a role of maintaining an interval between the partition members 2 and securing the channels 4 and 5 in which two air flows 6 and 7 go through, respectively. Further, since element strength of the total heat exchange element 1 is weaken by dew condensation at the heat exchange, the spacing member 3 is required to have a structure retention performance under high humidity conditions.

Moreover, from the standpoint of securing product safety, the total heat exchange element itself is also required to have high flame retardance. As described above, various performances are required for the partition member 2 and the spacing member 3 of the total heat exchange element 1, and accordingly, various partition members 2 and spacing members 3 have been used.

Since a paper for total heat exchange element used as the partition member 2 is required to have both of the heat transfer property and the moisture permeation property and the flame retardance, a paper containing a beaten natural pulp and having a hygroscopic agent and a flame retardant applied thereon has been conventionally used.

For example, as a paper for total heat exchange element which has both of the heat transfer property and the moisture permeation property and is excellent in the gas barrier property so as not to occur mixing of indoor air and outdoor air, a paper containing a highly beaten natural pulp and a hygroscopic agent is disclosed (see, for example, Patent Document 1).

In Patent Document 2, a sheet for total heat exchanger having a film of a hydrophilic polymer on a porous sheet such as paper is disclosed.

RELATED ART DOCUMENTS

Patent Documents

Patent Document 1: WO2002/099193
Patent Document 2: JP-A-2008-014623

SUMMARY OF INVENTION

Problems to be Solved by the Invention

In the paper for total heat exchange element described in Patent Document 1, as the degree of beating natural pulp increases, a ratio of fine fibers in the raw material fibers, that is, a ratio of a fine fraction increases and thus the gas barrier property increases. However, along with a decrease in the moisture permeation property, the humidity exchange efficiency of the total heat exchange element decreases and the total heat exchange efficiency also decreases in some cases.

On the other hand, in the case where natural pulp is mildly beaten, the ratio of a fine fraction in the raw material fibers decreases, breathability improves, and the gas barrier property deteriorates. However, there is a problem in that in spite of improvement in the moisture permeation property of the paper for total heat exchange element, the humidity exchange efficiency of the total heat exchange element is not improved much.

In Patent Document 2, a film of a hydrophilic polymer such as viscose or polyvinyl alcohol is formed, so that air permeation resistance can be increased and the gas barrier property is improved, but the expansion and contraction degree resulting from temperature change is large, and the morphological stability is not good. Therefore, it is necessary to increase the strength of the base material that is a porous sheet such as paper, so that the partition member for the total heat exchange element becomes thick and the thermal conductivity and the moisture permeation property tend to be inferior.

Further, in the sheet for total heat exchanger in Patent Document 2, as for a paper obtained by papermaking of raw fibers which are beaten not so much, basis weight increases and density tends to decrease in order to prevent the occurrence of pinholes. Therefore, the thermal conductivity decreases and the temperature exchange efficiency of the total heat exchange element decreases. Further, although the pinhole portion can be closed at the coating, it is necessary to rigidly adjust the coating conditions.

In view of such a present situation, an object of the invention is to provide a paper for total heat exchange element which has both of the heat transfer property and the moisture permeation property and is also excellent in the gas barrier property, and a total heat exchange element exhibiting high humidity exchange efficiency and high temperature exchange efficiency.

Means for Solving the Problems

As a result of intensive investigations to solve the problems described above, the present inventor has completed the invention relating to the paper for total heat exchange element and the total heat exchange element described below.

(1) A paper for total heat exchange element comprising a base paper containing a beaten natural pulp and a hygroscopic agent applied to the base paper, wherein a ratio of a fine fraction having a fiber length of 0.05 mm or less in the beaten natural pulp is from 10 to 25%.

(1) The paper for total heat exchange element according to (2) above, wherein a ratio of fibrillation of the beaten natural pulp is 4.5% or more.

The paper for total heat exchange element according to (1) or (2) above, wherein the beaten natural pulp is a softwood bleached kraft pulp.

The paper for total heat exchange element according to any one of (1) to (3) above, wherein an application ratio of the hygroscopic agent is from 10 to 24% by weight.

The paper for total heat exchange element according to any one of (1) to (4) above, wherein a thickness is from 20 to 60 μm.

A total heat exchange element using the paper for total heat exchange element according to any one of (1) to (5) above.

Effects of the Invention

According to the paper for total heat exchange element of the present invention, in a paper for total heat exchange element containing a base paper containing a beaten natural pulp and a hygroscopic agent applied to the base paper, by controlling a ratio of a fine fraction having a fiber length of 0.05 mm or less in the beaten natural pulp to 10 to 25%, the desired gas barrier property can be achieved while maintaining both of the heat transfer property and the moisture permeation property.

Further, in the paper for total heat exchange element of the invention, by controlling a ratio of fibrillation of the beaten natural pulp to 4.5% or more, an effect of improving yield of the fine fraction having a fiber length of 0.05 mm or less is achieved and a paper layer of a high density is realized, and thus the gas barrier property of the paper for total heat exchange element is improved.

Moreover, in the paper for total heat exchange element of the invention, when the beaten natural pulp is a softwood bleached kraft pulp, it becomes possible to easily improve the ratio of fibrillation of the beaten natural pulp.

Furthermore, in the paper for total heat exchange element of the invention, by applying the hygroscopic agent, it has been found that the moisture permeation property can be maintained even when the ratio of a fine fraction of the beaten natural pulp is varied. It is estimated that this is because the hygroscopic agent applied adheres to each of the fine fraction to facilitate the movement of water molecules in the thickness direction of the paper for total heat exchange element.

In the case where the ratio of a fine fraction is less than 10%, the humidity exchange efficiency of the total heat exchange element is not improved, even when the hygroscopic agent is applied or even when an application ratio of the hygroscopic agent is increased to improve the moisture permeation property. It is considered that this is because the movement of water molecules in the state of water vapor only occurs.

EMBODIMENTS FOR CARRYING OUT THE INVENTION

Hereinafter, the paper for total heat exchange element of the present invention will be described in detail. In the specification, % in mass basis (% by mass) and % in weight basis (% by weight) are synonymous. Further, "to" indicating a numerical value range is used to mean a range including numerical values given before and after "to" as a lower limit value and an upper limit value, respectively.

The paper for total heat exchange element of the invention is a paper for total heat exchange element containing a base paper containing a beaten natural pulp and a hygroscopic agent applied to the base paper, wherein a ratio of a fine fraction having a fiber length of 0.05 mm or less in the beaten natural pulp is from 10 to 25%. In the invention, the ratio of a fine fraction is a length-weighted fine content: Fines (L) value (unit: %) measured in the Proj mode using Kajaani FiberLab V3.5 fiber length measuring machine manufactured by Metso Automation and means a fiber component having a fiber length range of 0.05 mm or less.

Further, in the invention, a ratio of fibrillation of the beaten natural pulp is preferably 4.5% or more. By controlling the ratio of fibrillation to 4.5% or more, an effect of improving yield of the fine fraction having a fiber length of 0.05 mm or less is achieved and also a paper layer of a high density is realized, so that the gas barrier property of the paper for total heat exchange element is improved. In the invention, the ratio of fibrillation is a fibrillation value (unit: %) measured in the Proj mode using Kajaani FiberLab V3.5 fiber length measuring machine manufactured by Metso Automation. The ratio of fibrillation of the beaten natural pulp is more preferably 5.0% or more, and still more preferably 5.5% or more. Further, it is more preferably 7.0% or less, and still more preferably 6.6% or less.

The total heat exchange element is an element installed in a total heat exchanger which supplies fresh outside air and also exhausts foul air in the room in order to maintain a comfortable space in buildings, offices, stores, residences, and the like. Ventilation is performed through the total heat exchange element in such a manner that outside air is not mixed with indoor exhaust. At the ventilation, sensible heat (temperature) and latent heat (humidity), which are energy in the room, are recovered through a paper for total heat exchange element used in the total heat exchange element.

The paper for total heat exchange element is a paper used in the partition member that partitions two air flows where heat should be exchanged and effects heat and moisture exchange. In the total heat exchange element of the invention, the structure thereof may be anyone, as long as it is a total heat exchange element produced by using the paper for the total heat exchange element of the invention is used in the partition member.

Figure 2:
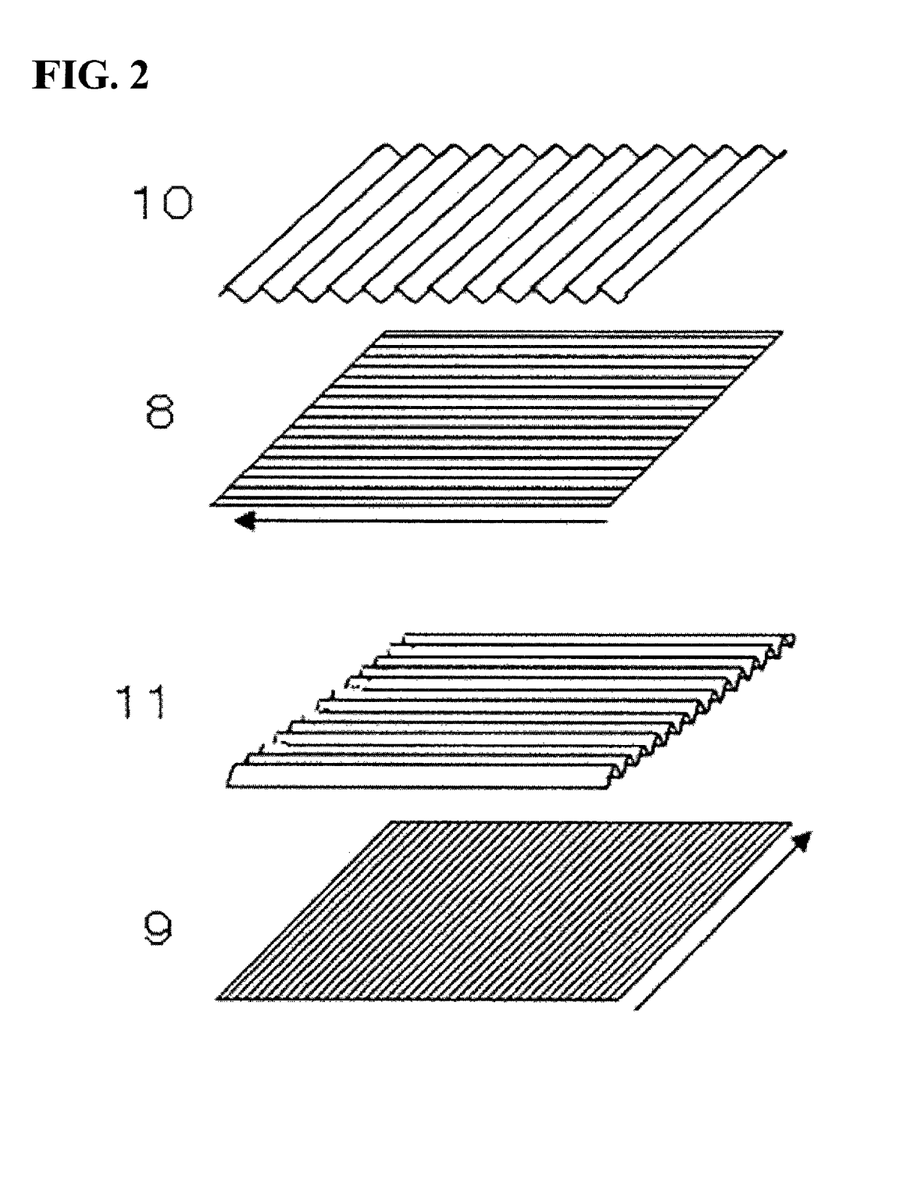
FIG. 2 is a disassembled perspective view showing a laminating order of each member in the total heat exchange element having a cross flow type laminated structure.

FIG. 1 shows a schematic perspective view of a total heat exchange element having a corrugated structure which is a cross flow type laminated structure, which is a representative structure of the total heat exchange element. The corrugated structure is a structure in which the paper for total heat exchange element of the invention is used as a liner sheet that is the partition member 2 and lamination is performed so that the wave directions of core sheets that are the spacing members 3 intersect each other at a right angle or an angle close to a right angle. FIG. 2 is a disassembled perspective view showing a laminating order of each member in the total heat exchange element having a cross flow type laminated structure, wherein a spacing member A 10, a partition member A 8, a spacing member B 11, and a partition member B 9 are laminated in this order, and the lamination is performed so that the wave directions of the spacing member A 10 and the spacing member B 11 interseceach other at a right angle or an angle close to a right angle. In FIG. 2, arrows mean flow directions on a paper machine.

In the invention, the natural pulp includes wood pulps, for example, a hardwood bleached kraft pulp (abbreviation: LBKP), a softwood bleached kraft pulp (abbreviation: NBKP), a hardwood bleached sulfite pulp (abbreviation: LB SP), a softwood bleached sulfite pulp (abbreviation: NBSP), a hardwood unbleached kraft pulp (abbreviation: LUKP), and a softwood unbleached kraft pulp (abbreviation: NUKP). The wood pulps can be used individually or as a combination of two or more thereof. Further, a plant fiber, for example, cotton, cotton linter, hemp, bamboo, sugar cane, cone or Kenaf; an animal fiber, for example, wool or silk; and a cellulose regenerated fiber, for example, rayon, cupra or lyocell may also be used individually or as a combination of two or more thereof.

Although, the hardwood pulp is derived from fivers having cell wall supporting wood, the softwood pulp is mainly composed of tracheids and allows water to pass easily. Of the softwood pulps, a softwood bleached kraft pulp (NBKP) having high strength is most suitable for a paper for total heat exchange element. Although NBKP has a disadvantage that uniformity of texture or the like is poor, single use of NBKP is desirable.

The natural pulp is appropriately subjected to a beating treatment by means of a beating device such as a double disc refiner, a deluxe finer, a Jordan or a conical refiner in order to increase the bond strength between pulp fibers, maintain the sheet shape, and increase the gas barrier property. Thus, the pulp is processed so that the ratio of a fine fraction is 10 to 25%.

By increasing the ratio of a fine fraction of the beaten natural pulp and reducing the basis weight of the base paper, the yield of the ratio of a fine fraction at the time of making the base paper is deteriorated, and as a result, the ratio of a fine fraction in the paper for total heat exchange element decreases. Since the ratio of a fine fraction in the beaten natural pulp, which is a raw material of the paper for total heat exchange element, is 10 to 25%, a paper for total heat exchange element excellent in the gas barrier property can be stably obtained while maintaining an excellent heat transfer property. Further, when the ratio of a fine fraction is 10% or more, it becomes possible to maintain the moisture permeation property even when the ratio of a fine fraction is changed by applying a hygroscopic agent.

In a paper machine, a paper layer is formed from large fibers, and a minute fine fraction are retained in the gaps. The ratio of a fine fraction is a ratio of the large fibers to the minute fibers and serves as an index of the filling degree of the paper layer. When the ratio of a fine fraction is small, the paper is composed of the large fibers, so that the number of voids increases and gas easily passes through. When the ratio of a fine fraction is increased, a dense paper layer is formed, but when the ratio of a fine fraction is excessively increased, the yield in papermaking may be deteriorated, and operability such as paper breakage and drying trouble may be worsened.

Therefore, the ratio of a fine fraction of the beaten natural pulp in the present invention is from 10 to 25%, preferably from 10 to 20%. A more preferable ratio of a fine fraction is 12% or more, and an even more preferable ratio of a fine fraction is 15% or more.

In the present invention, the paper can be made using a Fourdrinier, cylinder, twin wire, on-top, hybrid or other paper machine. Moreover, the density of the paper can be adjusted and the uniformity of the paper can be improved by subjecting the paper to a super calender treatment, a thermal calender treatment or the like after papermaking.

The hygroscopic agent includes inorganic acid salts, organic acid salts, inorganic fillers, polyhydric alcohols, ureas, hygroscopic polymers (water absorbing polymers), and the like.

For example, the inorganic acid salts include lithium chloride (LiCl), calcium chloride ($CaCl_2$)), magnesium chloride, and the like. The organic acid salts include sodium lactate, calcium lactate, sodium pyrrolidonecarboxylate, and the like. The inorganic fillers include aluminum hydroxide, calcium carbonate, aluminum silicate, magnesium silicate, talc, clay, zeolite, diatomaceous earth, sepiolite, silica gel, activated carbon, and the like. The polyhydric alcohols include glycerin, ethylene glycol, triethylene glycol, polyglycerin, and the like. Ureas include urea, hydroxyethylurea, and the like. The hygroscopic polymers include polyaspartic acid, polyacrylic acid, polyglutamic acid, polylysine, alginic acid, carboxymethyl cellulose, hydroxyalkyl cellulose, and salts or crosslinked products thereof; carrageenan, pectin, gellan gum, agar, xanthan gum, hyaluronic acid, guar gum, gum arabic, starch, and crosslinked products thereof; polyethylene glycol, polypropylene glycol, collagen, saponified acrylonitrile-based polymers, starch/acrylate salt graft copolymers, saponified vinyl acetate/acrylate salt copolymers, starch/acrylonitrile graft copolymers, acrylate salt/acrylamide copolymers, polyvinyl alcohol/maleic anhydride copolymers, polyethylene oxide-based ones, isobutylene-maleic anhydride copolymers, polysaccharide/acrylate salt graft self-crosslinked ones, and the like.

By applying the hygroscopic agent to the base paper, a paper for total heat exchange element having moisture permeation property can be obtained. The hygroscopic agent can be used with appropriately selecting the type and the adhesion amount according to the desired moisture permeation property. The application ratio of the hygroscopic agent (on the basis of mass after drying) is preferably 10% or more, more preferably 12% or more, and further preferably 15% or more based on the base paper. Moreover, it is preferably 24% or less, more preferably 20% or less, and further preferably 18% or less.

A flame retardant may be applied to the paper for total heat exchange element of the present invention. The flame retardant includes inorganic flame retardants, inorganic phosphorus compounds, nitrogen-containing compounds, chlorine compounds, bromine compounds, and the like. Examples thereof include a mixture of borax and boric acid, aluminum hydroxide, antimony trioxide, ammonium phosphate, ammonium polyphosphate, ammonium sulfamate, guanidine sulfamate, guanidine phosphate, phosphoramides, chlorinated polyolefins, ammonium bromide, and flame retardants that are dispersible in an aqueous solution or water, for example, a non-ether type polybromo cyclic compounds. The application ratio of the flame retardant (on the basis of mass after drying) is preferably from 10 to 30%, more preferably 13% or more, and still more preferably 15% or more, based on the base paper. Moreover, it is more preferably 25% or less, and further preferably 20% or less.

The thickness of the paper for total heat exchange element of the present invention is preferably from 20 to 60 μm. By controlling the thickness to 60 μm or less, a better moisture permeation property can be obtained. Further, by controlling the thickness to 20 μm or more, the generation of pinholes and the like can be suppressed and a better gas barrier property can be obtained.

The thickness of the paper is more preferably 30 μm or more and more preferably 50 μm or less.

A method for producing the paper for total heat exchange element of the present invention will be described. In the method for producing the paper for total heat exchange element of the present invention, a hygroscopic agent is applied to a base paper containing a beaten natural pulp in which a ratio of a fine fraction having a fiber length of 0.05 mm or less is from 10 to 25%. When the flame retardant is also applied, there is a case where the hygroscopic agent may be applied after applying the flame retardant to the base paper, or a case where a mixed liquid of the flame retardant and the hygroscopic agent may be applied to the base paper.

When the flame retardant is applied after applying the hygroscopic agent to the base paper containing the beaten natural pulp, process troubles such as poor appearance such as yellowing and paper breakage owing to strength deterioration may occur depending on the type of the hygroscopic agent.

As the method for applying a liquid containing the hygroscopic agent and/or the flame retardant to the base paper, a size press method, a dipping method, a coater method, a spraying method, and the like may be mentioned.

EXAMPLES

Hereinafter, the present invention will be described in detail with reference to Examples. Incidentally, the present invention is not limited to Examples. Unless otherwise specified, % in Examples is based on mass. Moreover, unless otherwise specified, the values indicating the coated amount and the applied amount are based on mass after drying.
(Modified Freeness)

In each of Examples and Comparative Examples, there was measured the Canadian modified freeness (the Canadian modified freeness described in WO2002/099193; hereinafter, sometimes referred to as "modified freeness") of a beaten natural pulp.

Modified freeness: A value measured in accordance with the Canadian standard freeness test method of JIS P 8121-2: 2012, except that 0.5 g of a pulp was sampled in an absolutely dry state and a 80-mesh plain-woven bronze wire was used as a sieve plate.
(Application Amount of Hygroscopic Agent and Application Amount of Flame Retardant)

"Application amount of hygroscopic agent" and "Application amount of flame retardant" are values calculated from "Basis weight after application−Basis weight before application".
(Application Ratio of Hygroscopic agent) "Application ratio of hygroscopic agent" was calculated using the following <Formula A>.

Application ratio of hygroscopic agent (%)=Application amount of hygroscopic agent/Basis weight of base paper×100     <Formula A>

(Thickness and Density of Base Paper, Thickness of Paper for Total Heat Exchange Element)

The thickness and density of a base paper are values obtained by measuring thickness and density at a temperature of 23° C. under a relative humidity of 50% in accordance with JIS P 8118: 2014 "Paper and board–Test method for thickness, density, and specific volume–Paper and board–Determination of thickness, density and specific volume".

Example 1-1

After a softwood bleached kraft pulp (NBKP) was disintegrated at a concentration of 4.5% (weight ratio), it was beaten using a double disc refiner, and a base paper having a basis weight of 30 g/m$^2$ was made using a Fourdrinier paper machine. The base paper was subjected to a machine calender treatment so that the density of the base paper was 0.82 g/cm$^3$. Lithium chloride as a hygroscopic agent was applied to the base paper in an amount of 4.9 g/m$^2$ by an impregnation processing machine to obtain a paper for total heat exchange element. The ratio of a fine fraction of the beaten pulp was 18%.

Example 1-2

After a softwood bleached kraft pulp (NBKP) was disintegrated at a concentration of 4.5%, it was beaten using a double disc refiner, and a base paper having a basis weight of 20 g/m² was made using a Fourdrinier paper machine. The base paper was subjected to a machine calender treatment so that the density of the base paper was 0.79 g/cm³. Lithium chloride as a hygroscopic agent was applied to the base paper in an amount of 4.0 g/m² by an impregnation processing machine to obtain a paper for total heat exchange element. The ratio of a fine fraction of the beaten pulp was 20%.

Example 1-3

After a softwood bleached kraft pulp (NBKP) was disintegrated at a concentration of 4.5% (weight ratio), it was beaten using a double disc refiner, and a base paper having a basis weight of 40 g/m² was made using a Fourdrinier paper machine. The base paper was subjected to a machine calender treatment so that the density of the base paper was 0.90 g/cm³. Guanidine sulfamate as a flame retardant was applied in an amount of 5.8 g/m² and further lithium chloride as a hygroscopic agent was applied in an amount of 4.2 g/m² to the base paper by an impregnation processing machine to obtain a paper for total heat exchange element. The ratio of a fine fraction of the beaten pulp was 17%.

Comparative Example 1-1

After a pulp obtained by mixing a hardwood bleached kraft pulp (LBKP) and a softwood bleached kraft pulp (NBKP) in a ratio of 8:3 (weight ratio) was disintegrated at a concentration of 4.5%, it was beaten using a double disc refiner, and a base paper having a basis weight of 30 g/m² was made using a Fourdrinier paper machine. The base paper was subjected to a machine calender treatment so that the density of the base paper was 0.72 g/cm³. Guanidine sulfamate as a flame retardant was applied in an amount of 6.9 g/m² and further lithium chloride as a hygroscopic agent was applied in an amount of 4.2 g/m² to the base paper by an impregnation processing machine to obtain a paper for total heat exchange element. The ratio of a fine fraction of the beaten pulp was 8%.

Comparative Example 1-2

After a pulp obtained by mixing a hardwood bleached kraft pulp (LBKP) and a softwood bleached kraft pulp (NBKP) in a ratio of 8:3 (weight ratio) was disintegrated at a concentration of 4.5%, it was beaten using a double disc refiner, and a base paper having a basis weight of 40 g/m² was made using a Fourdrinier paper machine. The base paper was subjected to a machine calender treatment so that the density of the base paper was 0.84 g/cm³. Guanidine sulfamate as a flame retardant was applied in an amount of 5.8 g/m² and further lithium chloride as a hygroscopic agent was applied in an amount of 5.0 g/m² to the base paper by an impregnation processing machine to obtain a paper for total heat exchange element. The ratio of a fine fraction of the beaten pulp was 7%.

Comparative Example 1-3

After a softwood bleached kraft pulp (NBKP) was disintegrated at a concentration of 4.5%, it was beaten using a double disc refiner, and a base paper having a basis weight of 30 g/m² was made using a Fourdrinier paper machine. The base paper was subjected to a machine calender treatment so that the density of the base paper was 1.06 g/cm³. Guanidine sulfamate as a flame retardant was applied in an amount of 4.2 g/m² and further lithium chloride as a hygroscopic agent was applied in an amount of 3.2 g/m² to the base paper by an impregnation processing machine to obtain a paper for total heat exchange element. The ratio of a fine fraction of the beaten pulp was 9%.

For the papers for total heat exchange element produced in the above examples, the gas barrier property was evaluated by the following evaluation method. The results are summarized in Table 1 together with the modified freeness (ml).

(Toluene Permeability)

As a permeability test for volatile substances, with reference to JIS Z0208: 1976 "Moisture Permeability Test Method (Cup Method) for Moisture-Proof Packaging Materials Testing Methods for Determination of the Water Vapour Transmission Rate of Moisture-Proof Packaging Materials (Dish Method)", the gas barrier property of a paper for total heat exchange element was evaluated by the toluene permeability measured by the following method.

Approximately 200 g of reagent grade toluene manufactured by Fuji Film Wako Pure Chemical Industries, Ltd. was placed in a stainless steel cup, and the opening part of the stainless steel cup was covered with an analyte obtained by punching a paper for total heat exchange element into a disc shape having a diameter of 70 mm and sealed by clamping it with a ring having an inner diameter of 58 mm. The whole was allowed to stand under conditions of a temperature of 23° C. and a relative humidity of 50%, and the weight loss of toluene was measured every 30 minutes. The mass M1 of the entire stainless steel cup was measured at the time when the rate of mass decrease became constant, and the mass M2 was further measured in the same manner after 30 minutes had passed. The toluene permeability was determined with the conversion into a 24 hour value according to <Formula B>.

When the toluene permeability measured by this method is less than 500 g/m²·24 h, the gas barrier property can be said to be good, and the toluene permeability is more preferably less than 100 g/m²·24 h, and further preferably 25 g/m²·24 h.

Toluene permeability (g/m²·24 h)=Toluene permeation amount/filtration area×24×60/30   <Formula B>

Toluene permeation amount (g)=Mass M1−Mass M2

Filtration area=26.42 cm²

TABLE 1

| | Natural pulp | Modified freeness ml | Ratio of fine fraction % | Basis weight of base paper g/m² | Density of base paper g/cm³ | Type of hygroscopic agent | Application amount of hygroscopic agent g/m² | Application ratio of hygroscopic agent | Type of flame retardant | Application amount of flame retardant g/m² | Toluene permeability g/m²·24 h |
|---|---|---|---|---|---|---|---|---|---|---|---|
| Example 1-1 | NBKP | 70 | 18 | 30 | 0.82 | lithium chloride | 4.9 | 16% | — | — | 14 |
| Example 1-2 | NBKP | 60 | 20 | 20 | 0.79 | lithium chloride | 4.0 | 20% | — | — | 25 |

TABLE 1-continued

| | Natural pulp | Modified freeness ml | Ratio of fine fraction % | Basis weight of base paper g/m² | Density of base paper g/cm³ | Type of hygroscopic agent | Application amount of hygroscopic agent g/m² | Application ratio of hygroscopic agent | Type of flame retardant | Application amount of flame retardant g/m² | Toluene permeability g/m²·24 h |
|---|---|---|---|---|---|---|---|---|---|---|---|
| Example 1-3 | NBKP | 70 | 17 | 40 | 0.90 | lithium chloride | 4.2 | 11% | guanidine sulfamate | 5.8 | 21 |
| Comparative Example 1-1 | LBKP NBKP | 200 | 8 | 30 | 0.72 | lithium chloride | 4.2 | 14% | guanidine sulfamate | 6.9 | 1,200 |
| Comparative Example 1-2 | LBKP NBKP | 200 | 7 | 40 | 0.84 | lithium chloride | 5.0 | 13% | guanidine sulfamate | 5.8 | 1,500 |
| Comparative Example 1-3 | NBKP | 200 | 9 | 30 | 1.06 | lithium chloride | 3.2 | 11% | guanidine sulfamate | 4.2 | 500 |

<Evaluation>

Examples 1-1 to 1-3 are papers for total heat exchange element containing a base paper containing a beaten natural pulp and a hygroscopic agent applied to the base paper, wherein the ratio of a fine fraction having a fiber length of 0.05 mm or less in the beaten natural pulp is from 10 to 25%. The toluene permeability was 25 g/m²·0.24 h or less in all cases. On the other hand, in Comparative Examples 1-1 to 1-3, the ratio of a fine fraction ratio in the beaten natural pulp was less than 10%, and the toluene permeability was 500 g/m²·0.24 h or more, which was remarkably high. It is understood that they had a low gas barrier property.

Example 2-1

After a softwood bleached kraft pulp (NBKP) was disintegrated at a concentration of 4.5%, it was beaten using a double disc refiner, and a base paper having a basis weight of 30 g/m² was made using a Fourdrinier paper machine. As a result of performing a machine calender treatment, the density of the base paper was 0.81 g/cm³. Lithium chloride as a hygroscopic agent was applied to the base paper in an amount of 4.7 g/m² by an impregnation processing machine to obtain a paper for total heat exchange element. The ratio of a fine fraction of the beaten pulp was 18% and the ratio of fibrillation was 4.4%.

Example 2-2

After a softwood bleached kraft pulp (NBKP) was disintegrated at a concentration of 4.5%, it was beaten using a double disc refiner, and a base paper having a basis weight of 20 g/m² was made using a Fourdrinier paper machine. As a result of performing a machine calender treatment, the density of the base paper was 0.77 g/cm³. Lithium chloride as a hygroscopic agent was applied to the base paper in an amount of 3.8 g/m² by an impregnation processing machine to obtain a paper for total heat exchange element. The ratio of a fine fraction of the beaten pulp was 20% and the ratio of fibrillation was 4.0%.

For the papers for total heat exchange element of Examples 1-1, 1-2, 2-1, and 2-2, the results of evaluation of toluene permeability are summarized in Table 2 together with the ratio of fibrillation and the like.

TABLE 2

| | Natural pulp | Modified freeness ml | Ratio of fine fraction % | Ratio of fibrillation % | Basis weight of base paper g/m² | Density of base paper g/cm³ | Type of hygroscopic agent | Application amount of hygroscopic agent g/m² | Application ratio of hygroscopic agent | Toluene permeability g/m²·24 h |
|---|---|---|---|---|---|---|---|---|---|---|
| Example 1-1 | NBKP | 70 | 18 | 6.6 | 30 | 0.82 | lithium chloride | 4.9 | 16% | 14 |
| Example 1-2 | NBKP | 60 | 20 | 5.5 | 20 | 0.79 | lithium chloride | 4.0 | 20% | 25 |
| Example 2-1 | NBKP | 110 | 18 | 4.4 | 30 | 0.81 | lithium chloride | 4.7 | 16% | 173 |
| Example 2-2 | NBKP | 100 | 20 | 4.0 | 20 | 0.77 | lithium chloride | 3.8 | 19% | 102 |

<Evaluation>

Examples 1-1 and 1-2 and Examples 2-1 and 2-2 are papers for total heat exchange element containing a base paper containing a beaten natural pulp and a hygroscopic agent applied to the base paper, wherein the ratio of a fine fraction having a fiber length of 0.05 mm or less in the beaten natural pulp is from 10 to 25%. In Examples 1-1 and 1-2, the ratio of fibrillation of the beaten natural pulp was 4.5% or more, and the toluene permeability was 25 g/m²·24 h or less. On the other hand, in Examples 2-1 and 2-2, the ratio of fibrillation of the beaten natural pulp is less than 4.5%, and the toluene permeability was 100 g/m²·24 h or more, which was higher as compared with the cases of Examples 1-1 and 1-2. From the above, it is understood that by controlling the ratio of fibrillation of the beaten natural pulp to 4.5% or more, the gas barrier property of the paper for total heat exchange element becomes high.

Example 3-1

After a natural pulp where the ratio of a softwood bleached kraft pulp (NBKP) and a hardwood bleached kraft pulp (LBKP) was controlled to 1:2 was disintegrated at a concentration of 4.5%, it was beaten using a double disc refiner, and a base paper having a basis weight of 30 g/m² was made using a Fourdrinier paper machine. As a result of performing a machine calender treatment, the density of the base paper was 0.74 g/cm³. Lithium chloride as a hygroscopic agent was applied to the base paper in an amount of 4.7 g/m² by an impregnation processing machine to obtain a paper for total heat exchange element. The ratio of a fine fraction of the beaten pulp was 10% and the ratio of fibrillation was 4.8%.

Example 3-2

After a natural pulp where the ratio of a softwood bleached kraft pulp (NBKP) and a hardwood bleached kraft pulp (LBKP) was controlled to 1:2 was disintegrated at a concentration of 4.5%, it was beaten using a double disc refiner, and a base paper having a basis weight of 50 g/m² was made using a Fourdrinier paper machine. As a result of performing a machine calender treatment, the density of the base paper was 0.78 g/cm³. Guanidine sulfamate as a flame retardant was applied in an amount of 5.8 g/m² and further lithium chloride as a hygroscopic agent was applied in an amount of 5.0 g/m² to the base paper by an impregnation processing machine to obtain a paper for total heat exchange element. The ratio of a fine fraction of the beaten pulp was 10% and the ratio of fibrillation was 4.8%.

Example 3-3

After a natural pulp where the ratio of a softwood bleached kraft pulp (NBKP) and a hardwood bleached kraft pulp (LBKP) was controlled to 1:1 was disintegrated at a concentration of 4.5%, it was beaten using a double disc refiner, and a base paper having a basis weight of 40 g/m² was made using a Fourdrinier paper machine. As a result of performing a machine calender treatment, the density of the base paper was 0.76 g/cm³. Lithium chloride as a hygroscopic agent was applied to the base paper in an amount of 5.2 g/m² by an impregnation processing machine to obtain a paper for total heat exchange element. The ratio of a fine fraction of the beaten pulp was 14% and the ratio of fibrillation was 5.6%.

For the papers for total heat exchange element of Examples 3-1 to 3-3, the results of evaluation of toluene permeability and breaking length are summarized in Table 3 together with the ratio of fibrillation and the like. The method for evaluating the breaking length is as follows.

(Breaking Length (Longitudinal))

As a strength test of the paper for total heat exchange element, there was measured the breaking length described in JIS P8113: 1998 "Paper and board–A test method for tensile property PAPER and board-Determination of tensile properties". The breaking length in the flow direction (longitudinal direction) on the paper machine was measured. The breaking length is calculated according to <Formula C>.

$$\text{Breaking length (longitudinal) (km)} = 1/9.8 \times \text{Tensile strength (kN/m)/Basis weight (g/m}^3\text{)} \times 10^3 \quad \text{<Formula C>}$$

TABLE 3

| | Natural pulp | Modified freeness ml | Ratio of NBKP | Ratio of fine fraction % | Ratio of fibrillation % | Basis weight of base paper g/m² | Density of base paper g/cm³ | Type of hygroscopic agent | Application amount of hygroscopic agent g/m² | Application ratio of hygroscopic agent | Type of flame retardant | Application amount of flame retardant g/m² | Toluene permeability g/m²·24 h | Breaking length (longitudinal) km |
|---|---|---|---|---|---|---|---|---|---|---|---|---|---|---|
| Example 1-1 | NBKP | 70 | 100% | 18 | 6.6 | 30 | 0.82 | lithium chloride | 4.9 | 16% | — | — | 14 | 2.0 |
| Example 1-3 | NBKP | 70 | 100% | 17 | 4.9 | 40 | 0.90 | lithium chloride | 4.2 | 11% | guanidine sulfamate | 5.8 | 21 | 2.4 |
| Example 3-1 | LBKP NBKP | 200 | 33% | 10 | 4.8 | 30 | 0.74 | lithium chloride | 4.7 | 16% | — | — | 260 | 1.0 |
| Example 3-2 | LBKP NBKP | 270 | 33% | 10 | 4.8 | 50 | 0.78 | lithium chloride | 5.0 | 10% | guanidine sulfamate | 5.8 | 340 | 1.7 |
| Example 3-3 | LBKP NBKP | 230 | 50% | 14 | 5.6 | 40 | 0.76 | lithium chloride | 5.2 | 13% | — | — | 210 | 1.8 |

<Evaluation>

Examples 1-1 and 1-3 and Examples 3-1 to 3-3 are papers for total heat exchange element containing a base paper containing a beaten natural pulp and a hygroscopic agent applied to the base paper, wherein the ratio of a fine fraction having a fiber length of 0.05 mm or less in the beaten natural pulp is from 10 to 25%. Moreover, the ratio of fibrillation of the beaten natural pulp is 4.5% or more. In Examples 1-1 and 1-3, the mass ratio of NBKP (NBKP ratio) in the total pulp was 100%, and the breaking length (longitudinal) of the papers for total heat exchange element was 2.0 km or more. On the other hand, in Examples 3-1 to 3-3, even when the NBKP ratio is controlled to 33 to 50%, the breaking length (longitudinal) is less than 2.0 km and thus the strength of the papers for total heat exchange element is slightly reduced, but the toluene permeability is less than 500 g/m²·24 h, and it is understood that a good gas barrier property is obtained.

Comparative Example 1-4

A 1% paste liquid of oxidized starch was applied to a base paper obtained by papermaking under the same conditions as in Example 1-1 in an amount of 0.1 g/m² on a size press, and a machine calender treatment was performed so that the density was 0.82 g/cm³ the same as that of Example 1-1, thus obtaining a paper for total heat exchange element.

Comparative Example 1-5

Guanidine sulfamate as a flame retardant was applied to a base paper obtained by papermaking under the same conditions as in Example 1-1 in an amount of 5.3 g/m² on an impregnation processing machine to obtain a paper for total heat exchange element having a density of 0.82 g/cm³ the same as that of Example 1-1.

Comparative Example 1-6

A mixed liquid of a 0.8% paste liquid of oxidized starch and a 0.2% acrylonitrile-based surface sizing agent was applied to a base paper obtained by papermaking under the same conditions as in Example 1-2 in an amount of 0.1 g/m² on a size press, and a machine calender treatment was performed so that the density was 0.79 g/cm³ the same as that of Example 1-2, thus obtaining a paper for total heat exchange element.

Comparative Example 1-7

Guanidine sulfamate as a flame retardant was applied to a base paper obtained by papermaking under the same conditions as in Example 1-3 in an amount of 5.3 g/m² on an impregnation processing machine to obtain a paper for total heat exchange element having a density of 0.90 g/cm³ the same as that of Example 1-3.

For the papers for total heat exchange element of Comparative Examples 1-4 to 1-7, the results of evaluation of toluene permeability and moisture permeability are summarized in Table 4 together with the results of Examples 1-1 to 1-3. The method for evaluating the moisture permeability is as follows.

(Moisture Permeability)

The latent heat (humidity) exchangeability (moisture permeation property) of a paper for total heat exchange element was evaluated with the moisture permeability measured in accordance with JIS Z0208: 1976 "Moisture Permeability Test Method for Moisture-Proof Packaging Materials (Cup Method) Testing Methods for Determination of the Water Vapor Transmission Rate of Moisture-Proof Packaging Materials (Dish Method)", except that the following conditions were changed.

The element performance measurement conditions in JIS B8628: 2003 "Total heat exchanger Air to air heat exchanger" are as follows: at the time of heating, indoor: dry bulb 20° C., wet bulb 14° C. (relative humidity 48%), outdoor: dry bulb 5° C., wet bulb 2° C. (relative humidity 53%), at the time of cooling, indoor: dry bulb 27° C., wet bulb 20° C. (relative humidity 50%), outdoor: dry bulb 35° C., wet bulb 29° C. (relative humidity 63%). Thus, since the temperature is in the range of 5 to 35° C. and the relative humidity is in the range of 48 to 63%, the conditions were changed to the temperature of 23° C. and the relative humidity of 50%. Further, in order to evaluate the heat exchange performance in a short time, the mass was measured after 30 minutes and converted into a 24-hour value, thus obtaining the moisture permeability.

TABLE 4

| | Natural pulp | Modified freeness ml | Ratio of fine fraction % | Basis weight of base paper g/m² | Density of base paper g/cm³ | Type of hygroscopic agent | Application amount of hygroscopic agent g/m² | Application ratio of hygroscopic agent | Type of flame retardant | Application amount of flame retardant g/m² | Thickness of paper μm | Toluene permeability g/m²·24 h | Moisture permeability g/m²·24 h |
|---|---|---|---|---|---|---|---|---|---|---|---|---|---|
| Example 1-1 | NBKP | 70 | 18 | 30 | 0.82 | lithium chloride | 4.9 | 16% | — | — | 43 | 14 | 1,070 |
| Comparative Example 1-4 | NBKP | 70 | 18 | 30 | 0.82 | — | — | 0% | — | — | 35 | 14 | 150 |
| Comparative Example 1-5 | NBKP | 70 | 18 | 30 | 0.82 | — | — | 0% | guanidine sulfamate | 5.3 | 47 | 20 | 160 |
| Example 1-2 | NBKP | 60 | 20 | 20 | 0.79 | lithium chloride | 4.0 | 20% | — | — | 33 | 25 | 1,250 |
| Comparative Example 1-6 | NBKP | 60 | 20 | 20 | 0.79 | — | — | 0% | — | — | 25 | 25 | 240 |
| Example 1-3 | NBKP | 70 | 17 | 40 | 0.90 | lithium chloride | 4.2 | 11% | guanidine sulfamate | 5.8 | 55 | 21 | 590 |
| Comparative Example 1-7 | NBKP | 70 | 17 | 40 | 0.90 | — | — | 0% | guanidine sulfamate | 5.3 | 39 | 16 | 210 |

<Evaluation>

From the comparison of Example 1-1 with Comparative Example 1-4 and Comparative Example 1-5, the comparison of Example 1-2 with Comparative Example 1-6, and the comparison of Example 1-3 with Comparative Example 1-7, it is understood that even when the ratio of a fine fraction of the beaten natural pulp is from 10 to 25%, sufficient moisture permeability cannot be obtained without applying a hygroscopic agent. That is, by applying a hygroscopic agent to the base paper, a paper for total heat exchange element having excellent humidity exchanging property (moisture permeation property) can be obtained.

From the above results, in order to obtain a paper for total heat exchange element having an excellent gas barrier property and an excellent humidity exchanging property, it is understood that a base paper containing a beaten natural pulp having a ratio of a fine fraction of 10 to 25% and application of a hygroscopic agent to the base paper are necessary.

Example 1-4

A paper for total heat exchange element was obtained by applying guanidine sulfamate as a flame retardant in an amount of 5.1 g/m² and further applying lithium chloride as a hygroscopic agent in an amount of 5.0 g/m² to a base paper obtained by papermaking under the same conditions as in Example 1-1 on an impregnation processing machine.

Example 1-5

A paper for total heat exchange element was obtained by applying lithium chloride as a hygroscopic agent in an amount of 5.0 g/m² to a base paper obtained by papermaking under the same conditions as in Example 1-1 on an impregnation processing machine.

Example 1-6

A paper for total heat exchange element was obtained by applying lithium chloride as a hygroscopic agent in an amount of 2.5 g/m² to a base paper obtained by papermaking under the same conditions as in Example 1-1 on an impregnation processing machine.

Example 1-7

A paper for total heat exchange element was obtained by applying lithium chloride as a hygroscopic agent in an amount of 1.5 g/m² to a base paper obtained by papermaking under the same conditions as in Example 1-1 on an impregnation processing machine.

Example 1-8

A paper for total heat exchange element was obtained by applying lithium chloride and calcium chloride (mass ratio 1:1) as hygroscopic agents in an amount of 6.0 g/m² to a base paper obtained by papermaking under the same conditions as in Example 1-1 on an impregnation processing machine.

Example 1-9

A paper for total heat exchange element was obtained by applying lithium chloride and calcium chloride (mass ratio 1:1) as hygroscopic agents in an amount of 7.6 g/m² to a base paper obtained by papermaking under the same conditions as in Example 1-1 on an impregnation processing machine.

For the papers for total heat exchange element of Examples 1-4 to 1-9, the results of evaluation of moisture permeability and dew floating are summarized in Table 5 together with the results of Example 1-1 and Comparative Example 1-4. The method for evaluating the dew floating is as follows.

(Dew Floating)

A sample of 25 mm wide×250 mm of a paper for total heat exchange element was allowed to stand under the conditions of a temperature of 25° C. and a relative humidity of 90%, and it was visually confirmed whether dew was present on the paper surface and whether the dew was dripping.

TABLE 5

| | Natural pulp | Modified freeness ml | Ratio of fine fraction % | Basis weight of base paper g/m² | Type of hygroscopic agent | Application amount of hygroscopic agent g/m² | Application ratio of hygroscopic agent | Type of flame retardant | Application amount of flame retardant g/m² | Moisture permeability g/m² · 24 h | Dew floating |
|---|---|---|---|---|---|---|---|---|---|---|---|
| Example 1-1 | NBKP | 70 | 18 | 30 | lithium chloride | 4.9 | 16% | — | — | 1,070 | absent |
| Example 1-4 | NBKP | 70 | 18 | 30 | lithium chloride | 5.0 | 17% | guanidine sulfamate | 5.1 | 980 | absent |
| Example 1-5 | NBKP | 70 | 18 | 30 | lithium chloride | 5.0 | 17% | — | — | 870 | absent |
| Example 1-6 | NBKP | 70 | 18 | 30 | lithium chloride | 2.5 | 8% | — | — | 660 | absent |
| Example 1-7 | NBKP | 70 | 18 | 30 | lithium chloride | 1.5 | 5% | — | — | 410 | absent |
| Comparative Example 1-4 | NBKP | 70 | 18 | 30 | — | — | 0% | — | — | 150 | absent |
| Example 1-8 | NBKP | 70 | 18 | 30 | calcium chloride:lithium chloride = 1:1 | 6.0 | 20% | — | — | 940 | slightly present |
| Example 1-9 | NBKP | 70 | 18 | 30 | calcium chloride:lithium chloride = 1:1 | 7.6 | 25% | — | — | 1,210 | dew dripping |

<Evaluation>

Examples 1-1 and 1-4 to 1-9 and Comparative Example 1-4 are all papers for total heat exchange element each containing a beaten natural pulp-containing base paper, wherein the ratio of a fine fraction in the beaten natural pulp is 18% which falls within the range of 10 to 25%. As compared with the paper for total heat exchange element of Comparative Example 1-4, the papers for total heat exchange element of Examples 1-1 and 1-4 to 1-9 exhibited a high moisture permeation property because the papers contained a hygroscopic agent.

When Examples 1-1 and 1-4 to 1-7 are compared with one another, it is understood that the moisture permeability becomes high as the application ratio of the hygroscopic agent increases. Particularly, in Examples 1-1, 1-4 and 1-5 in which the application ratio of the hygroscopic agent is 10% or more, it is understood that the moisture permeability becomes extremely high, and a high humidity exchange efficiency is achieved.

From the results of Examples 1-8 and 1-9, in the case where calcium chloride and lithium chloride were used as the hygroscopic agents, when the application ratio of the hygroscopic agent was further increased to 20%, dew was slightly floated on the paper surface. Furthermore, when the ratio came to 25%, there occurred a phenomenon of dew dripping where a liquid dripped. When the paper for total heat exchange element that causes dew dripping is used, dew condensation occurs inside the total heat exchange element, and blockage of the flow channel and troubles such as corrosion of the total heat exchanger and electrical short circuit owing to the flowing-out liquid may be generated. Therefore, there is a preferable range for the application ratio of the hygroscopic agent, and although the range varies depending on the type of the hygroscopic agent used, it is generally preferably 24% or less, and more preferably 20% or less.

Example 1-10

A base paper having a basis weight of 15 g/m² was made under the same conditions as in Example 1-2 and was subjected to a machine calender treatment so that the density was 0.77 g/cm³. Lithium chloride as a hygroscopic agent was applied in an amount of 3.0 g/m² to the paper by an impregnation processing machine to obtain a paper for total heat exchange element having the same ratio of a fine fraction as that of Example 1-2.

Example 1-11

A base paper having a basis weight of 50 g/m² was made under the same conditions as in Example 1-3 and was subjected to a machine calender treatment so that the density was 0.92 g/cm³. Lithium chloride as a hygroscopic agent was applied in an amount of 5.0 g/m² to the paper by an impregnation processing machine to obtain a paper for total heat exchange element having the same ratio of a fine fraction as that of Example 1-3.

Example 1-12

Lithium chloride as a hygroscopic agent was applied in an amount of 7.6 g/m² to a base paper made under the same conditions as in Example 1-11 by an impregnation processing machine to obtain a paper for total heat exchange element having the same ratio of a fine fraction as that of Example 1-11.

Example 1-13

A base paper having a basis weight of 12 g/m² was made under the same conditions as in Example 1-2 and was subjected to a machine calender treatment so that the density was 0.75 g/cm³. Lithium chloride as a hygroscopic agent was applied in an amount of 2.4 g/m² to the paper by an impregnation processing machine to obtain a paper for total heat exchange element having the same ratio of a fine fraction as that of Example 1-2.

For the papers for total heat exchange element of Examples 1-10 to 1-13, the results of evaluation of paper thickness and toluene permeability are summarized in Table 6 together with the results of Examples 1-1 to 1-3.

TABLE 6

| | Natural pulp | Modified freeness ml | Ratio of fine fraction % | Basis weight of base paper g/m² | Density of base paper g/cm³ | Type of hygroscopic agent | Application amount of hygroscopic agent g/m² | Application ratio of hygroscopic agent | Type of flame retardant | Application amount of flame retardant g/m² | Paper thickness | Toluene permeability g/m²·24 h | Moisture permeability g/m²·24 h |
|---|---|---|---|---|---|---|---|---|---|---|---|---|---|
| Example 1-1 | NBKP | 70 | 18 | 30 | 0.82 | lithium chloride | 4.9 | 16% | — | — | 43 | 14 | 1,070 |
| Example 1-2 | NBKP | 60 | 20 | 20 | 0.79 | lithium chloride | 4.0 | 20% | — | — | 33 | 25 | 1,250 |
| Example 1-3 | NBKP | 70 | 17 | 40 | 0.90 | lithium chloride | 4.2 | 11% | guanidine sulfamate | 5.8 | 55 | 21 | 590 |
| Example 1-10 | NBKP | 60 | 20 | 15 | 0.77 | lithium chloride | 3.0 | 20% | — | — | 20 | 170 | 1,360 |
| Example 1-11 | NBKP | 70 | 17 | 50 | 0.92 | lithium chloride | 5.0 | 10% | — | — | 68 | 10 | 380 |
| Example 1-12 | NBKP | 70 | 17 | 50 | 0.92 | calcium chloride | 7.6 | 15% | — | — | 78 | 10 | 390 |
| Example 1-13 | NBKP | 60 | 20 | 12 | 0.75 | lithium chloride | 2.4 | 20% | — | — | 16 | 450 | 1,450 |

<Evaluation>

Examples 1-1 to 1-3 and Examples 1-10 to 1-13 are papers for total heat exchange element containing a base paper containing a beaten natural pulp, wherein the ratio of a fine fraction in the beaten natural pulp is from 10 to 25%. Moreover, they are papers for total heat exchange element wherein a hygroscopic agent is applied to the base paper and the application ratio of the hygroscopic agent is from 10 to 20%. However, since the basis weight of the base paper is different, the thickness of the paper for total heat exchange element (paper thickness) is also different. As a result of comparing these papers with one another, it was found that there is a correlation between the paper thickness and the toluene permeability (gas barrier property) and the moisture permeability. That is, in Examples 1-11 and 1-12 in which the paper thickness exceeds 60 μm, although the toluene permeability is very low, the moisture permeability also tends to decrease. Moreover, in the case of Example 1-13 in which the paper thickness is less than 20 μm, the moisture permeability is very high, but the toluene permeability tends to increase. It is considered that this is because air permeability is increased due to pinholes and the like.

From the above results, the thickness of the paper for total heat exchange element is preferably 20 to 60 μm. Further, 30 μm or more is more preferable, and 50 μm or less is more preferable.

Next, Examples of total heat exchange elements using the papers for total heat exchange element of the present invention will be described with reference to FIGS. 1 and 2.

Example 1-14

Using the paper for total heat exchange element obtained in Example 1-4 as a partition member 2, and using a corrugated woodfree paper of 52 g/m² molded in a corrugated cross-sectional structure as a spacing member 3, there was obtained a total heat exchange element having a corrugated structure, which had a cross flow type laminated structure. A spacing member A 10, a partition member A 8, a spacing member B 11, and a partition member B 9 were laminated in this order, the lamination was performed so that the wave directions of the spacing member A 10 and the spacing member B 11 intersected at a right angle (90°), and further, the lamination was performed so that the flow directions of the partition member A 8 and the partition member B 9 on the paper machine also intersected at a right angle (90°), thus laminating 157 layers by bonding respective members to obtain a total heat exchange element having a length of 280 mm, a width of 280 mm, and a height of 320 mm. At this time, the woodfree paper of 52 g/m² was molded into a corrugation pitch of 4.8 mm and a corrugation height of 2.0 mm on a corrugating machine. In addition, an ethylene-vinyl acetate-based adhesive was used for bonding the members.

Example 1-15

Using the paper for total heat exchange element obtained in Example 1-3 as a partition member 2, and using a corrugated bleached kraft paper of 60 g/m² molded in a corrugated cross-sectional structure as a spacing member 3, there was obtained a total heat exchange element having a corrugated structure, which was a cross flow type laminated structure. A spacing member A 10, a partition member A 8, a spacing member B 11, and a partition member B 9 were laminated in this order, the lamination was performed so that the wave directions of the spacing member A 10 and the spacing member B 11 intersected at a right angle (90°), and further, the lamination was performed so that the flow directions of the partition member A 8 and the partition member B 9 on the paper machine also intersected at a right angle (90°), thus laminating 121 layers by bonding respective members to obtain a total heat exchange element having a length of 280 mm, a width of 280 mm, and a height of 320 mm. At this time, the bleached kraft paper of 60 g/m² was molded into a corrugation pitch of 5.8 mm and a corrugation height of 2.6 mm on a corrugating machine. In addition, an ethylene-vinyl acetate-based adhesive was used for bonding the members.

Example 1-16

Using the paper for total heat exchange element obtained in Example 1-2 as a partition member 2, and using a flame-retardant paper of 60 g/m², which was obtained by impregnating a woodfree paper with a flame retardant and then molded in a corrugated cross-sectional structure, as a spacing member 3, there was obtained a total heat exchange element having a corrugated structure, which was a cross-flow type laminated structure. A spacing member A 10, a partition member A 8, a spacing member B 11, and a partition member B 9 were laminated in this order, the lamination was performed so that the wave directions of the spacing member A 10 and the spacing member B 11 intersected at a right angle (90°), and further, the lamination was performed so that the flow directions of the partition member A 8 and the partition member B 9 on the paper machine also intersected at a right angle (90°), thus laminating 157 layers by bonding respective members to obtain a total heat exchange element having a length of 280 mm, a width of 280 mm, and a height of 320 mm. At this time, the bleached kraft paper of 60 g/m² was molded into a corrugation pitch of 4.8 mm and a corrugation height of 1.85 mm on a corrugating machine. In addition, an ethylene-vinyl acetate-based adhesive was used for bonding the members.

Comparative Example 1-8

A total heat exchange element was obtained in the same manner as in Example 1-14, except that the paper for total heat exchange element obtained in Comparative Example 1-1 was used as the partition member 2.

Comparative Example 1-9

A total heat exchange element was obtained in the same manner as in Example 1-15, except that the paper for total heat exchange element obtained in Comparative Example 1-2 was used as the partition member 2.

Comparative Example 1-10

A total heat exchange element was obtained in the same manner as in Example 1-14, except that the paper for total heat exchange element obtained in Comparative Example 1-5 was used as the partition member 2.

Example 1-17

A total heat exchange element was obtained in the same manner as in Example 1-14, except that the paper for total heat exchange element obtained in Example 1-7 was used as the partition member 2 and the number of laminated layers was set to 158 layers.

Example 1-18

A total heat exchange element was obtained in the same manner as in Example 1-14, except that the paper for total heat exchange element obtained in Example 1-9 was used as the partition member 2.

Example 1-19

A total heat exchange element was obtained in the same manner as in Example 1-14, except that the paper for total heat exchange element obtained in Example 1-11 was used as the partition member 2 and the number of laminated layers was set to 155 layers.

Example 2-3

A total heat exchange element was obtained in the same manner as in Example 1-16, except that the paper for total heat exchange element obtained in Example 2-2 was used as the partition member 2.

Example 3-4

A total heat exchange element was obtained in the same manner as in Example 1-15, except that the paper for total heat exchange element obtained in Example 3-2 was used as the partition member 2.

The total heat exchange elements produced in the above example were evaluated by the following evaluation methods. The results are summarized in Table 7.

(Total Heat Exchange Efficiency, Temperature Exchange Efficiency, Humidity Exchange Efficiency)

In accordance with JIS B8628: 2003, using the total heat exchange elements of Examples 1-14 to 1-19, 2-3, and 3-4 and Comparative Examples 1-8 to 1-10, the total heat exchange efficiency (total heat, temperature and humidity) was evaluated.

(Dew Condensation)

Ventilation was performed for 24 hours under measurement conditions for element performance during cooling in JIS B8628: 2003 "indoor: dry bulb 27° C., wet bulb 20° C. (relative humidity 50%), outdoor: dry bulb 35° C., wet bulb 29° C. (relative humidity 63%)", and the state of dew condensation and the like generated on the element were visually observed.

exchange efficiency is. However, in Example 1-18, since the liquid dripping owing to the dew condensation water is confirmed, depending on the use environment, there is a concern that the performance may deteriorate with time due to a failure of the total heat exchanger or a loss of the hygroscopic agent. The dew condensation was also confirmed in Examples 1-14, 3-4, 1-16 and 2-3, but it was an amount that could be absorbed by the paper for total heat exchange element itself and the spacing member.

While the invention has been described in detail and with reference to specific embodiments thereof, it will be apparent to those skilled in the art that various changes and modifications can be made therein without departing from the spirit and scope of the invention. This application is based on a Japanese patent application filed on Mar. 28,

TABLE 7

| | Partition member (paper for total heat exchange element) | | | Spacing member | | Wave shape of corrugate | | Number of laminated | Exchange efficiency | | | Dew condensation |
|---|---|---|---|---|---|---|---|---|---|---|---|---|
| | Type | Basis weight of base paper g/m² | Application ratio of hygroscopic agent | Thickness of paper μm | Type | Basis weight g/m² | Pitch mm | Height mm | Layers layer | Total heat | Temperature | Humidity | |
| Example 1-14 | Example 1-4 | 30 | 17% | 48 | woodfree paper | 52 | 4.8 | 2.0 | 157 | 70% | 87% | 56% | slight dew condensation at partition member |
| Comparative Example 1-8 | Comparative Example 1-1 | 30 | 14% | 50 | woodfree paper | 52 | 4.8 | 2.0 | 157 | 53% | 66% | 45% | absent |
| Example 1-15 | Example 1-3 | 40 | 11% | 55 | bleached kraft paper | 60 | 5.8 | 2.6 | 121 | 61% | 78% | 49% | absent |
| Example 3-4 | Example 3-2 | 50 | 10% | 55 | bleached kraft paper | 60 | 5.8 | 2.6 | 121 | 51% | 54% | 41% | slight dew condensation at partition member |
| Comparative Example 1-9 | Comparative Example 1-2 | 40 | 13% | 61 | bleached kraft paper | 60 | 5.8 | 2.6 | 121 | 44% | 57% | 36% | absent |
| Example 1-16 | Example 1-2 | 20 | 20% | 33 | flame-retardant paper | 60 | 4.8 | 1.85 | 170 | 76% | 91% | 62% | a little dew condensation at partition member |
| Example 2-3 | Example 2-2 | 20 | 19% | 33 | flame-retardant paper | 60 | 4.8 | 1.85 | 170 | 74% | 89% | 60% | dew condensation at partition member |
| Comparative Example 1-10 | Comparative Example 1-5 | 30 | 0% | 47 | woodfree paper | 52 | 4.8 | 2.0 | 157 | 48% | 70% | 33% | absent |
| Example 1-17 | Example 1-7 | 30 | 5% | 38 | woodfree paper | 52 | 4.8 | 2.0 | 158 | 54% | 71% | 41% | absent |
| Example 1-18 | Example 1-9 | 30 | 25% | 48 | woodfree paper | 52 | 4.8 | 2.0 | 157 | 75% | 88% | 63% | occurrence of liquid dripping |
| Example 1-19 | Example 1-11 | 50 | 10% | 68 | woodfree paper | 52 | 4.8 | 2.0 | 155 | 46% | 76% | 18% | absent |

<Evaluation>

From these results, when Example 1-14 is compared with Comparative Example 1-8, and Examples 1-15 and 3-4 are compared with Comparative Example 1-9, the temperature exchange efficiency and the humidity exchange efficiency are both higher in Examples in which the ratio of a fine fraction in the beaten natural pulp is from 10 to 25%.

When Comparative Example 1-10 is compared with Examples 1-17 and 1-18 on the basis of Example 1-14, the higher the application ratio of the hygroscopic agent of the paper for total heat exchange element is, the higher the 2018 (Japanese Patent Application No. 2018-062977) and a Japanese patent application filed on Jan. 15, 2019 (Japanese Patent Application No. 2019-011164), and the whole contents thereof are incorporated herein by reference.

INDUSTRIAL APPLICABILITY

The paper for total heat exchange element of the present invention is utilized for a total heat exchange element of a total heat exchanger in which heat exchange of sensible heat (temperature) and latent heat (humidity) is performed at the time of supplying fresh outside air and exhausting foul air in the room (and which supplies fresh outside air).

REFERENCE SIGNS LIST

1: Total heat exchange element
2: Partition member
3: Spacing member
4: Flow channel
5: Flow channel
6: Air flow
7: Air flow
8: Partition member A
9: Partition member B
10: Spacing member A
11: Spacing member B

The invention claimed is:

1. A paper for total heat exchange element comprising:
a base paper containing a beaten natural pulp, and
a hygroscopic agent applied to the base paper,
wherein a ratio of a fine fraction having a fiber length of 0.05 mm or less in the beaten natural pulp is from 10 to 25%, and
wherein a ratio of fibrillation of the beaten natural pulp is 4.5% or more.

2. The paper for total heat exchange element according to claim 1, wherein the beaten natural pulp is a softwood bleached kraft pulp.

3. The paper for total heat exchange element according to claim 1, wherein an application ratio of the hygroscopic agent is from 10 to 24% by weight.

4. The paper for total heat exchange element according to claim 1, wherein a thickness is from 20 to 60 μm.

5. A total heat exchange element using the paper for total heat exchange element according to claim 1.

6. The paper for total heat exchange element according to claim 2, wherein an application ratio of the hygroscopic agent is from 10 to 24% by weight.

7. The paper for total heat exchange element according to claim 2, wherein a thickness is from 20 to 60 μm.

8. The paper for total heat exchange element according to claim 3, wherein a thickness is from 20 to 60 μm.

9. A total heat exchange element using the paper for total heat exchange element according to claim 2.

10. A total heat exchange element using the paper for total heat exchange element according to claim 3.

11. A total heat exchange element using the paper for total heat exchange element according to claim 4.

* * * * *